United States Patent [19]

Okura

[11] Patent Number: 5,087,002

[45] Date of Patent: Feb. 11, 1992

[54] ANCHORING APPARATUS FOR TELEPHONE WIRE

[76] Inventor: Masahiko Okura, 11-7, 4-chome, Shiroganedai, Minatoku, Tokyo, Japan

[21] Appl. No.: 640,686

[22] Filed: Jan. 14, 1991

[51] Int. Cl.⁵ .............................................. F16L 3/08
[52] U.S. Cl. ........................... 248/65; 174/156; 174/163 R; 248/218.4; 248/230
[58] Field of Search ............... 248/49, 58, 61, 63, 248/65, 230, 218.4; 174/41, 156, 163 R; 24/115

[56] References Cited

U.S. PATENT DOCUMENTS

| | | | |
|---|---|---|---|
| 3,055,623 | 9/1962 | Becker | 248/61 |
| 3,095,471 | 6/1963 | Price | 248/61 X |
| 3,217,086 | 11/1965 | Taylor | 248/63 X |
| 3,561,708 | 2/1971 | Dubey et al. | 248/65 X |
| 4,632,352 | 11/1986 | Stoll | 248/313 |
| 4,771,137 | 9/1988 | Thompson | 248/218.4 X |

*Primary Examiner*—Ramon O. Ramirez
*Attorney, Agent, or Firm*—Moonray Kojima

[57] ABSTRACT

Disclosed herein is a novel and heretofore never anounced anchoring apparatus for telephone wire comprising a thickish plate-like base body of small size having a T-shaped suspending rod member protruded upwardly and forwardly from the upper side of the base body, three bores perforating the body in a front and rear direction for guiding set screws, a bore perforating the base body in a front and rear direction for guiding a set bolt, while the rear side of the body has a laterally elongated groove of a circular arc shape in section and a dent surface of circular arc shape in section along the longitudinal axis of the body.

6 Claims, 2 Drawing Sheets

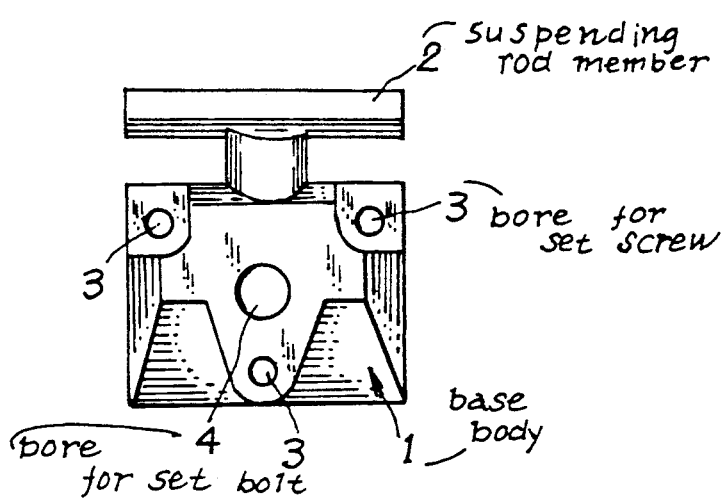
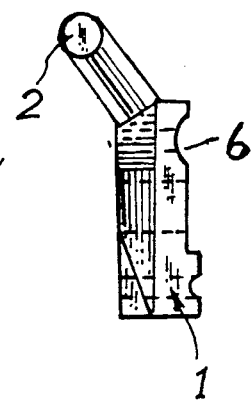
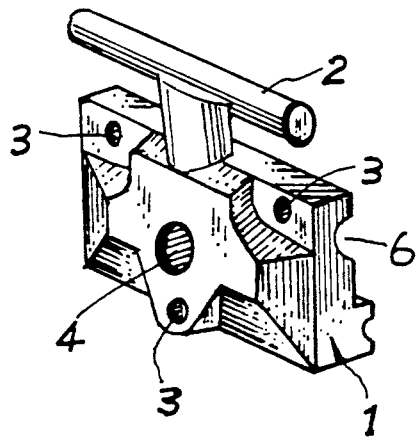
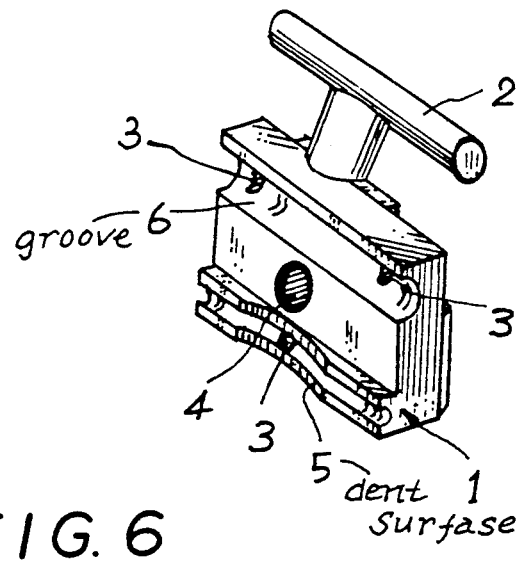
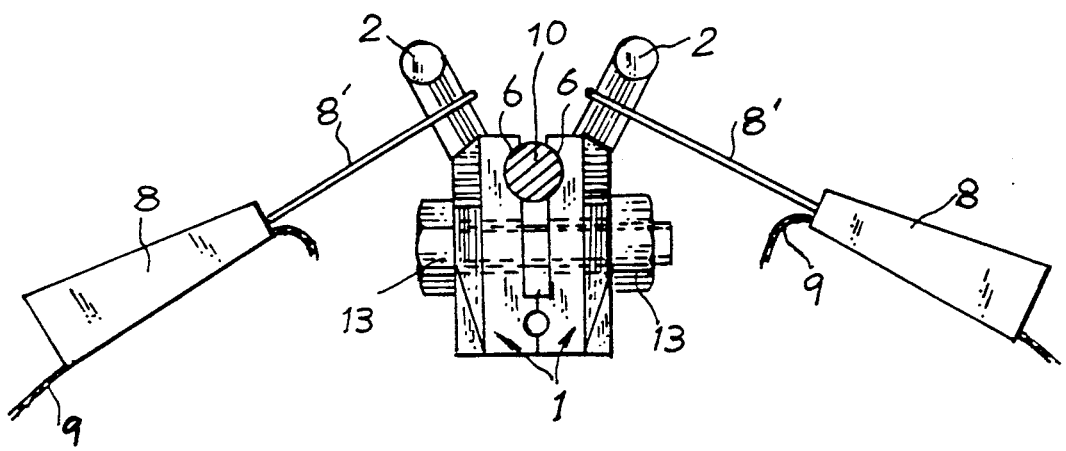

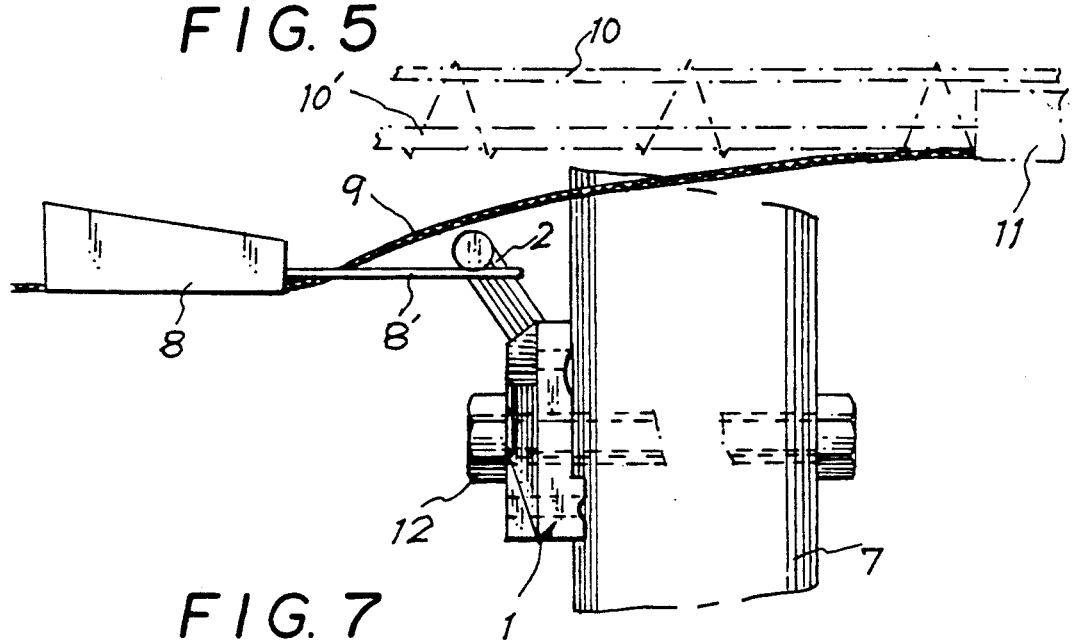
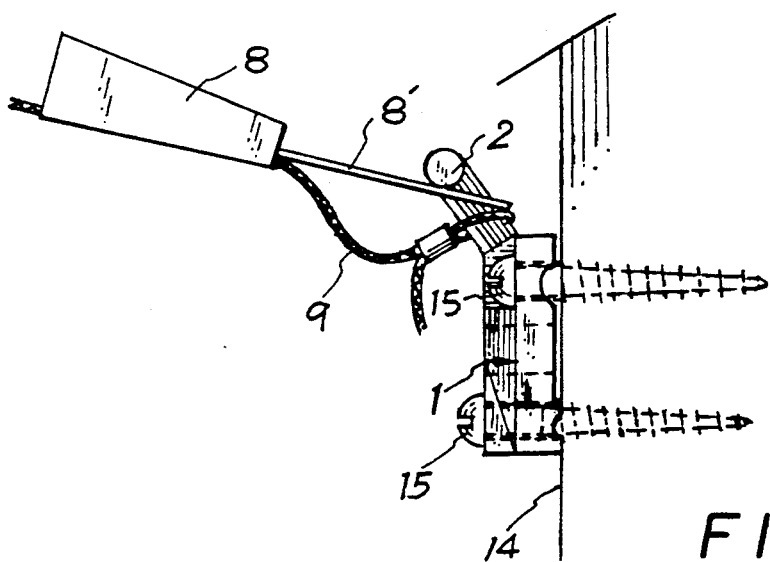
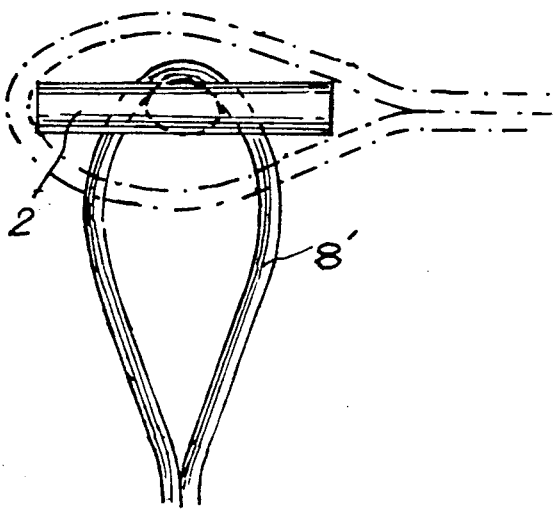

ANCHORING APPARATUS FOR TELEPHONE WIRE

BACKGROUND OF THE INVENTION

Heretofore, various anchoring apparatus have been used for telephone wire, each of which having respectively a distinct form in accordance with the anchoring points thereof.

SUMMARY OF THE INVENTION

This invented apparatus can be adapted for use in three anchoring points, i.e. anchoring the wire to an electric pole, to a messenger wire and to a subscriber's house, and it comprises a thickish plate-like base body of small size having a T-shaped suspending rod member protruded upwardly and forwardly from the upper side of the base body, three bores perforating the body in a front and rear direction for guiding set screws and a bore perforating the body in a front and rear direction for guiding a set bolt, while the rear side of the base body has a laterally elongated groove of a circular arc shape in section and a dent surface of a circular arc shape in section along the longitudinal axis thereof.

BRIEF DESCRIPTION OF THE DRAWING

FIG. 1 is a front elevational view of the one form of the invention;

FIG. 2 is an elevation of the same;

FIG. 3 is a perspective view in a case viewed from the front thereof;

FIG. 4 is a perspective view in a case viewed from the rear thereof;

FIG. 5 is an elevation showing an anchoring state;

FIG. 6 is an elevation showing other anchoring state;

FIG. 7 is an elevation showing another anchoring state;

FIG. 8 is a fragmental plan view showing a suspending condition of the T-shaped rod member.

DETAILED DESCRIPTION OF THE PREFERRED EMBODIMENT

In the Figures, 1 is a base body made of thickish metal plate of small size. 2 is a T-shaped suspending rod member set on the upper side of the base body to be protruded upwardly and forwardly. 3 is a bore perforating the body 1 in a front and rear direction into which a set screw of the body 1 may be fitted loosely. In this event, three bores 3 are located as shown in FIG. 1. 4 is a bore perforating the body 1 in front and rear direction, into which a set bolt may be fitted loosely to set the base body to an electric pole as shown in FIG. 5 or to conioint two base bodies in oppoiste relation as shown in FIG. 6. 5 is a dent surface portion of a circular arc shape in section formed in the rear side of the body 1 along the longitudinal axis of the body. 6 is a laterally elongated groove of carcular arc shape in section.

The anchoring states of the wire in the use of this apparatus are shown in FIGS. 5, 6, 7.

In FIG. 5, 7 is an electric pole. 8 is a well known clamp having a suspending wire 8' to be suspended to the suspending rod 2 of the present apparatus. 9 is a telephone wire. 10 is a messenger wire. 10' is a telephone cable. 11 is a terminal box. In this event, the indent surface 5 will be confronted with the cylindrical surface of the pole to be set by a set bolt 12 guided by the bore 4. A wood screw may be substituted for the bolt when the pole is made of wood.

Other anchoring state is shown in FIG. 6, wherein two base bodies 1, 1 are conjoined in opposite relation by a bolt 13 guided by the bore 4, at which time the messenger wire 10 is holded between opposed grooves 6, 6. 8, 8 are clamps. 8', 8' are suspending wire. 9 is a telephone wire. In such a case, the bore 4 will further be considerable to be formed into square in section for obtaining more stable conjoining condition of the two base bodies, in which event a conventional carriage bolt will be used in place of the one shown in the FIGURE. Such the bore formed into square in section will be effective even in the case shown in FIG. 5, in which case setting of the body 1 to the pole would becomes more stable by the use of a carriage bolt.

Another anchoring state is shown in FIG. 7, wherein the body 1 is set to the telephone subscriber's house 14 by a set screw (wood screw in this event) 15 guided by said bore 3. 8 is a clamp. 8' is a suspending wire. 9 is a telephone wire.

As understood from the aforesaid explanation, the apertures of three bores 3 are desirous to be arranged in a bottom up triangle points and the bore 4 is also desirous to be at the center, in the front side of the body.

According to this anchoring apparatus, since the things of only one form can be available for various anchoring points in place of the conventional things of various form, it will be characterized by substantial simplification in the work and cost saving as compared to prior measure. And further, since the suspending wire 8' of the clamp 8 is suspended to the T-shaped rod member 2 as shown in FIG. 8, the suspension thereof can be more certainly effected than the conventional L-shaped or the like hooks. In FIG. 8, the dot-dash line presents an initial suspending manipulation.

What is claimed is:

1. An anchoring apparatus for telephone wire comprising a thickish plate-like base body and a T-shaped suspending rod member set on the upper side of the base body to be protruded upwardly and forwardly, the front side of said base body having apertures of three bores perforating the body in a front and rear direction for guiding set screws of the base body and an aperture of a bore perforating the body in a front and rear direction for guiding a set bolt of the base body, while the rear side of said body has a laterally elongated groove of a circular arc shape in section and a dent surface of circular arc shape in section along the longitudinal axis of said body.

2. An anchoring apparatus as claimed in claim 1, wherein the apertures of said three bores guiding the set screws are arranged at a bottom up triangle points in the front side of the base body.

3. An anchoring apparatus as claimed in claim 1, wherein the aperture of said bore guiding the set bolt is located at the center of the front side of the base body.

4. The apparatus of claim 2, wherein the aperture of said bore guiding the set bolts is located at the center of the front side of the base body.

5. An anchoring apparatus as claimed 1, 2, 3 or 4, wherein said bore guiding the set bolt is formed into circle in section.

6. An anchoring apparatus as claimed 1, 2, 3 or 4, wherein said bore guiding the set bolt is formed into square in section to be used a carriage bolt thereto.

* * * * *